(12) United States Patent
Kawashima et al.

(10) Patent No.: US 10,274,010 B2
(45) Date of Patent: Apr. 30, 2019

(54) JOURNAL BEARING

(71) Applicant: Mitsubishi Electric Corporation, Chiyoda-ku, Tokyo (JP)

(72) Inventors: Koji Kawashima, Tokyo (JP); Shingo Kingetsu, Tokyo (JP); Taishi Hamasaki, Tokyo (JP); Hidenori Nagahama, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/513,839

(22) PCT Filed: Dec. 1, 2014

(86) PCT No.: PCT/JP2014/081721
§ 371 (c)(1),
(2) Date: Mar. 23, 2017

(87) PCT Pub. No.: WO2016/088166
PCT Pub. Date: Jun. 9, 2016

(65) Prior Publication Data
US 2017/0284465 A1 Oct. 5, 2017

(51) Int. Cl.
*F16C 17/02* (2006.01)
*F16C 17/03* (2006.01)
*F16C 33/10* (2006.01)

(52) U.S. Cl.
CPC ........ *F16C 33/1045* (2013.01); *F16C 17/022* (2013.01); *F16C 17/03* (2013.01)

(58) Field of Classification Search
CPC ........ F16C 17/02; F16C 17/022; F16C 17/03; F16C 17/035; F16C 33/046; F16C 33/10;
(Continued)

(56) References Cited

U.S. PATENT DOCUMENTS 2,459,826 A * 1/1949 Martellotti .......... F16C 32/0648
384/118
6,050,727 A * 4/2000 Messmer ................ F16C 17/03
384/117
(Continued)

FOREIGN PATENT DOCUMENTS

CN 102149931 A 8/2011
JP 11-125241 A 5/1999
(Continued)

OTHER PUBLICATIONS

International Search Report (PCT/ISA/210) dated Jan. 13, 2015, by the Japanese Patent Office as the International Searching Authority for International Application No. PCT/JP2014/081721.
(Continued)

*Primary Examiner* — James Pilkington
(74) *Attorney, Agent, or Firm* — Buchanan Ingersoll & Rooney PC

(57) ABSTRACT

A journal bearing, in which a lower half carrier ring is disposed on the outer peripheral side of a horizontally installed rotating shaft, and an upstream side pad and a downstream side pad are disposed on the inner side of the lower half carrier ring, includes an upstream side oil supply portion and downstream side oil supply portion which supply lubricant oil to the upstream side pad and downstream side pad, the bearing being characterized in that the supply quantity of lubricant oil supplied from downstream side oil supply nozzles of the downstream side oil supply portion is adjusted so as to be less than the supply quantity of lubricant oil supplied from upstream side oil supply nozzles of the upstream side oil supply portion.

9 Claims, 6 Drawing Sheets

(58) Field of Classification Search
CPC .. F16C 33/1045; F16C 33/105; F16C 33/106; F16C 33/1065; F16C 33/108
USPC .......................................... 384/117, 118, 122
See application file for complete search history.

(56) References Cited

U.S. PATENT DOCUMENTS

| | | | |
|---|---|---|---|
| 8,123,409 B2 * | 2/2012 | Waki | F16C 17/03 384/122 |
| 2010/0220944 A1 | 9/2010 | Waki et al. | |

FOREIGN PATENT DOCUMENTS

| | | |
|---|---|---|
| JP | 2000-274432 A | 10/2000 |
| JP | 2002-147455 A | 5/2002 |
| WO | WO 2010/097990 A1 | 9/2010 |

OTHER PUBLICATIONS

Written Opinion (PCT/ISA/237) dated Jan. 13, 2015, by the Japanese Patent Office as the International Searching Authority for International Application No. PCT/JP2014/081721.

Office Action (Notification of Reason for Refusal) dated Jun. 27, 2017, by the Japanese Patent Office in corresponding Japanese Patent Application No. 2016-562100, and an English Translation of the Office Action. (12 pages).

Office Action dated Jul. 2, 2018, by the Chinese Patent Office in corresponding Chinese Patent Application No. 201480083668.5 and English translation of the Office Action. (12 pages).

* cited by examiner

JOURNAL BEARING

TECHNICAL FIELD

The present invention relates to a journal bearing wherein the load of a horizontally installed rotating shaft is received by a plurality of pads.

BACKGROUND ART

A heretofore known journal bearing is of a structure in which a plurality of pads are disposed on the inner diameter side of a lower half carrier ring, and a pad stop which restrains a circumferential movement of each pad is provided. Further, the pad stops have a function as oil supply nozzles which discharge lubricant oil in order to form oil films between the outer peripheral surface of a rotating shaft and the inner peripheral surfaces of the pads (for example, refer to PTL 1).

CITATION LIST

Patent Literature

PTL 1: WO2010/097990 A1

SUMMARY OF INVENTION

Technical Problem

The heretofore known journal bearing is of a structure in which the quantities of lubricant oil supplied from a plurality of pad stops other than the pad stop positioned on the rearmost side of the lower half carrier ring in a shaft rotation direction of the rotating shaft are all the same, and it is not necessary to adjust an oil quantity per pad stop. Also, a structure is such that no oil supply nozzle is provided on the upper half carrier ring side, thereby reducing a supply quantity of lubricant oil for the whole of the bearing.

An upstream side pad is disposed in a position on the upstream side in the shaft rotation direction, and a downstream side pad is disposed in a position on the downstream side, on the inner side of the lower half carrier ring configuring the journal bearing. Further, in the heretofore known configuration, a sufficient quantity of lubricant oil necessary for oil film formation is supplied to all the pads. However, even when an appropriate lubricant oil quantity is supplied between the rotating shaft and the upstream side pad, there is the problem that as oil drained from the upstream side pad flows to the downstream side pad, as carry-over oil, as the rotating shaft rotates, the quantity of lubricant oil supplied to the downstream side pad is in excess by an amount equivalent to the carry-over oil. Also, when the quantity of oil supplied to each pad is too small, no sufficient oil film is formed between the rotating shaft and the pads, causing a rise in oil film temperature or causing vibration, noise, or the like.

In this way, with the heretofore known journal bearing, as the same quantity of lubricant oil is supplied to both the upstream side and downstream side pads, the supply quantity of lubricant oil necessary for the whole of the bearing becomes too large for a stable operation, and it is difficult to supply an appropriate quantity of lubricant oil to each pad.

The invention, having been contrived in order to solve the heretofore described problems, has for its object to adjust a lubricant oil quantity supplied in accordance with the disposition of the pads and thus optimize a lubricant oil quantity supplied to the whole of the journal bearing, thereby reducing the lubricant oil quantity, thus reducing a bearing loss and downsizing oil supply equipment.

Solution to Problem

A journal bearing according to the invention includes a carrier ring having an upper half carrier ring and lower half carrier ring disposed on the outer peripheral side of a horizontally installed rotating shaft; a first pad disposed on the inner side of the lower half carrier ring and a second pad disposed on the downstream side of the first pad; a first oil supply portion which supplies lubricant oil between the rotating shaft and the first pad and a second oil supply portion which supplies lubricant oil between the rotating shaft and the second pad, the journal bearing being characterized in that the supply quantity of lubricant oil supplied from the second oil supply portion is less than the supply quantity of lubricant oil supplied from the first oil supply portion.

Advantageous Effects of Invention

According to the journal bearing of the invention, by making the quantity of lubricant oil supplied from the second supply portion less than the quantity of lubricant oil supplied from the first supply portion, it is possible to make the quantity of lubricant oil circulated smaller than when the supply quantities of lubricant oil from the first and second supply portions are the same, and it is possible to downsize oil supply equipment and reduce a loss.

Objects, features, aspects, and advantageous effects of the invention other than the heretofore described will become more apparent from the following detailed description of the invention referring to the drawings.

DESCRIPTION OF EMBODIMENTS

Embodiment 1

Hereafter, a description will be given, using FIGS. 1 to 3, of a journal bearing according to Embodiment 1 of the invention. In the individual drawings, identical or equivalent members and regions will be described with identical signs.

The journal bearing of the invention, being a sliding bearing which is used for a horizontally installed rotating machine whose bearing load only acts downward, and which rotatably supports a rotating shaft, is of a configuration including a carrier ring having an upper half carrier ring and a lower half carrier ring, a plurality of pads, disposed spaced apart on the radially inner side of the lower half carrier ring, which receive the load of the rotating shaft, and oil supply nozzles for supplying lubricant oil to their corresponding pads, and is called a tilting pad journal bearing. It is possible to apply the journal bearing of the invention to, for example, a rotating electric machine.

First, a description will be given of a basic structure of a journal bearing 100 of the invention. FIG. 1 is a main portion sectional front view, perpendicular to an axial direction, showing the journal bearing 100 according to Embodiment 1 of the invention. In FIG. 1, suppose that a rotating shaft 101 supported by the journal bearing 100 rotates in the counterclockwise direction on the sheet. FIG. 2 is a main portion sectional side view, along the A-A line of FIG. 1, in the axial direction of the journal bearing 100. FIG. 3 illustrates sectional views of an upstream side oil supply nozzle 21a and downstream side oil supply nozzle 31a which are components of the journal bearing 100 and plan views showing discharge openings of each nozzle.

Figure 1:
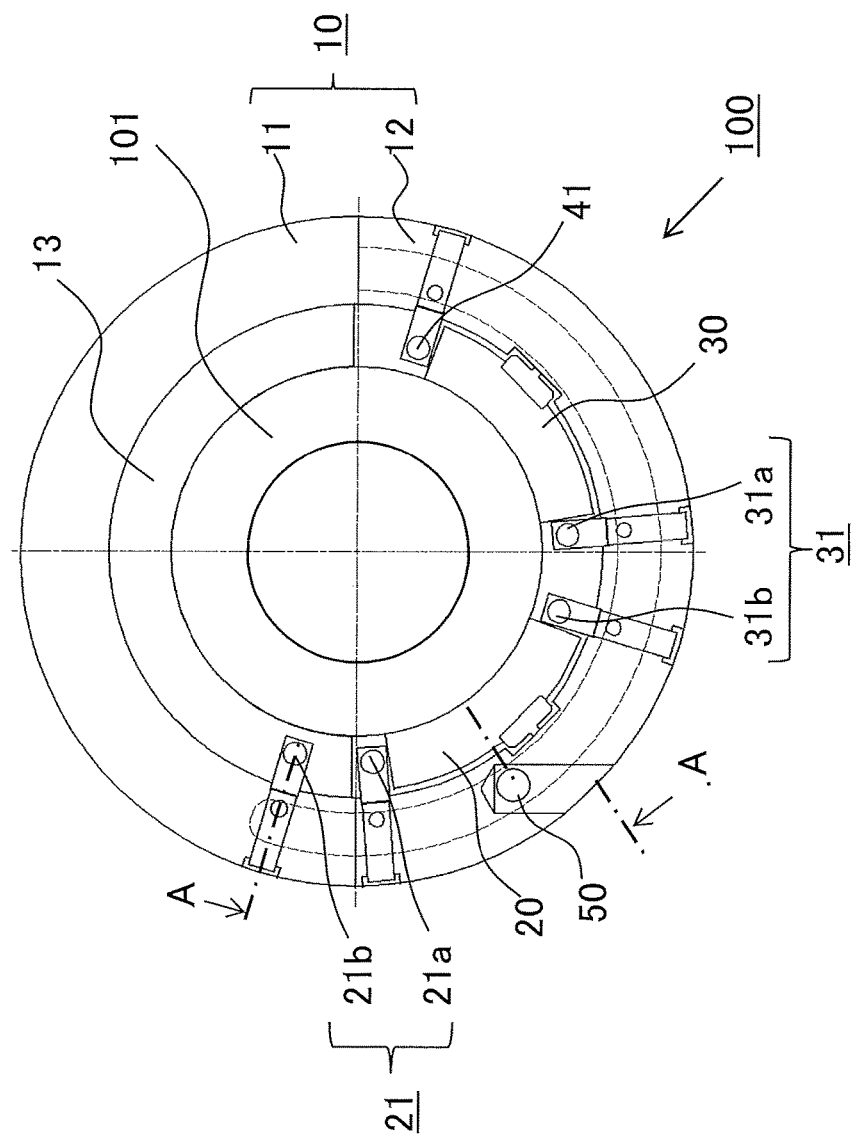
FIG. 1 is a main portion sectional front view perpendicular to the axial direction of a journal bearing according to Embodiment 1 of the invention.

As shown in FIG. 1, the rotating shaft 101, which is installed so that its axis is in a horizontal direction, is inserted into the annular journal bearing 100. The journal bearing 100, which rotatably supports the rotating shaft 101, includes a carrier ring 10 having an upper half carrier ring 11 and a lower half carrier ring 12, a guide metal 13 disposed on the radially inner side of the upper half carrier ring 11, an upstream side pad 20 (a first pad) and a downstream side pad 30 (a second pad) disposed downstream thereof, which are disposed spaced apart on the radially inner side of the lower half carrier ring 12 and receive the load of the rotating shaft 101, an upstream side oil supply portion 21 (a first oil supply portion), disposed on the upstream side in the rotation direction of the rotating shaft 101, which is for supplying lubricant oil to the upstream side pad 20, and a downstream side oil supply portion 31 (a second oil supply portion) for supplying lubricant oil to the downstream side pad 30, and further includes a guide metal oil supply nozzle 41 for supplying lubricant oil to the guide metal 13, in a portion, between the downstream side pad 30 and the guide metal 13, which is on the upstream side of the guide metal 13 in the rotation direction.

The upstream side oil supply portion 21, in order to supply lubricant oil between the upstream side pad 20 and the rotating shaft 101 and form an oil film, has a plurality of upstream side oil supply nozzles 21a and 21b (first oil supply nozzles), which discharge lubricant oil, on the upstream portion side of the upstream side pad 20, that is, in a region in which the upstream side pad 20 and guide metal 13 are adjacent. In the same way, the downstream side oil supply portion 31 disposed on the downstream side of the upstream side oil supply portion 21, in order to supply lubricant oil between the downstream side pad 30 and the rotating shaft 101 and form an oil film, has a plurality of downstream side oil supply nozzles 31a and 31b (second oil supply nozzles), which discharge lubricant oil, on the upstream portion side of the downstream side bad 30, that is, between the upstream side pad 20 and the downstream side pad 30.

As shown in FIG. 1, the upstream side oil supply nozzles 21a and 21b are disposed in two mutually separate places, for example, the upstream side oil supply nozzle 21a is disposed between the guide metal 13 and the upstream side pad 20 so as to be adjacent to the upstream side end portion of the upstream side pad 20, and the other upstream side oil supply nozzle 21b is disposed in the vicinity of a downstream side end portion of the guide metal 13 which is near the upstream side pad 20.

Also, as shown in FIG. 1, the downstream side oil supply nozzles 31a and 31b are disposed in two mutually separate places between the upstream side pad 20 and the downstream side pad 30, for example, the downstream side oil supply nozzle 31a is disposed so as to be adjacent to the upstream side end portion of the downstream side pad 30, and the other downstream side oil supply nozzle 31b is disposed in a downstream side end portion of the upstream side pad 20 which is near the downstream side pad 30.

Herein, the upstream side oil supply nozzles 21a and 21b or downstream side oil supply nozzles 31a and 31b, the dispositions thereof not being limited to the heretofore described examples, as long as the dispositions are such that lubricant oil can be supplied to the upstream side pad 20 or downstream side pad 30, may each be disposed in an upstream portion of its corresponding pad or in any position in the vicinity thereof.

Also, as shown in FIG. 1, lubricant oil is supplied to an oil supply pipe portion 50 of the journal bearing 100 from oil supply equipment, and is discharged to the outer peripheral side of the rotating shaft 101 from the individual nozzles via the pipe portion which connects the individual nozzles of the lower half carrier ring 12, and the lubricant oil drained from on the pads is circulated to the oil supply equipment.

Next, a description will be given of an operation of the journal bearing 100 and rotating shaft 101. The rotating shaft 101 is rotatably supported by the upstream side pad 20 and the downstream side pad 30 disposed on the downstream side of the upstream side pad 20. At this time, the rotating shaft 101 is not directly supported by the upstream side pad 20 or downstream side pad 30, but is supported by oil films formed between the individual pads and the rotating shaft 101. Lubricant oil necessary to form an oil film on the upstream side pad 20 or on the downstream side pad 30 is supplied by the upstream side oil supply nozzles 21a and 21b or downstream side oil supply nozzles 31a and 31b.

Figure 2:
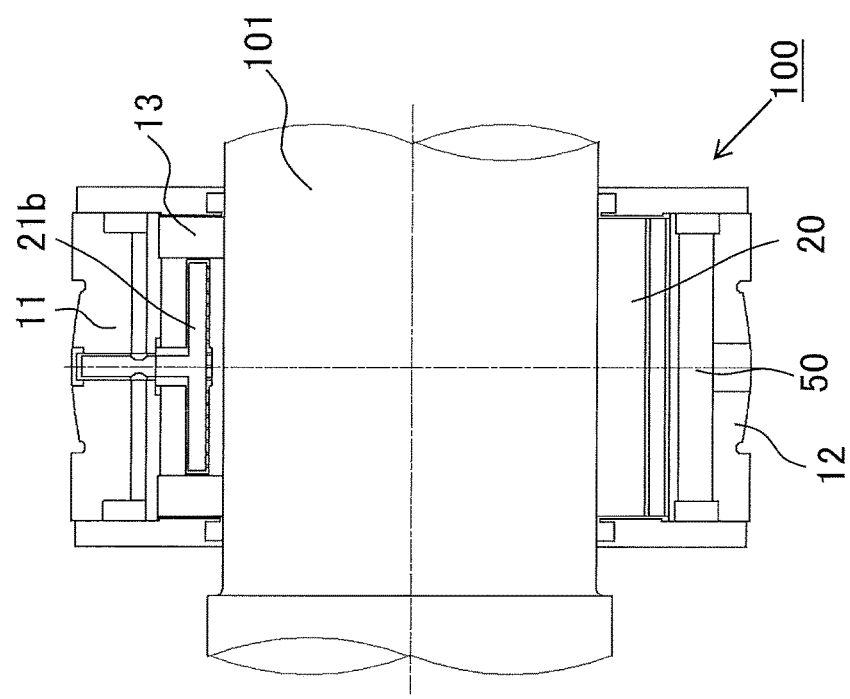
FIG. 2 is a main portion sectional side view in the axial direction of the journal bearing according to Embodiment 1 of the invention.

As shown in FIG. 2, the upstream side oil supply nozzle 21b is configured to discharge lubricant oil toward the outer peripheral surface side of the rotating shaft 101, and the other nozzles are also configured in the same way. Further, the rotating shaft 101 is supported on the upstream side pad 20 via unshown lubricant oil.

Figure 3:
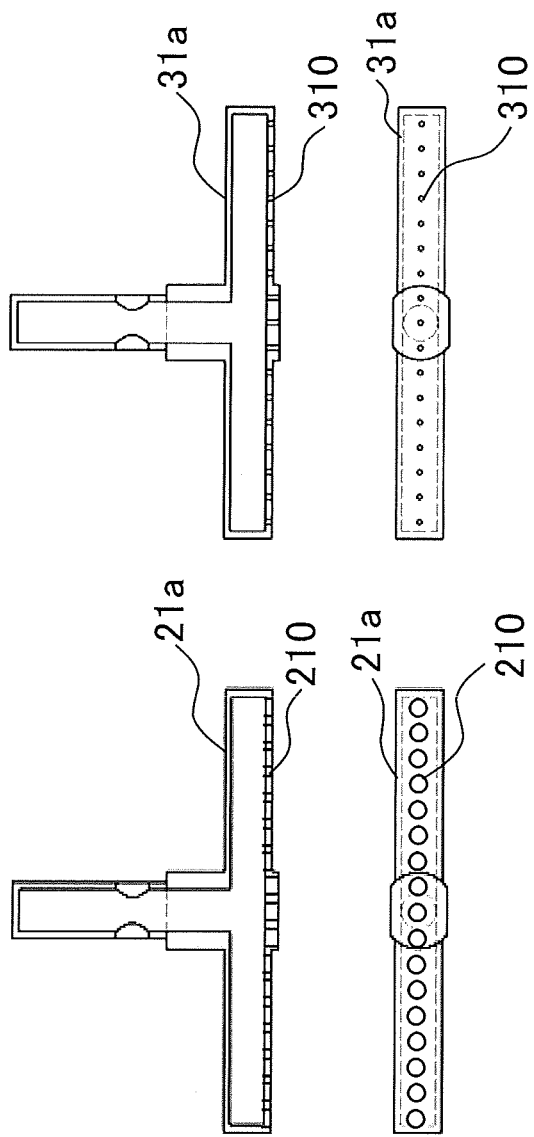
FIG. 3 illustrates sectional views of oil supply nozzles configuring the journal bearing according to Embodiment 1 of the invention and plan views showing discharge holes of the oil supply nozzles.

Also, as shown in FIG. 3, the number of discharge holes 210 opened in the upstream side oil supply nozzle 21a is the same as the number of discharge holes 310 opened in the downstream side oil supply nozzle 31a. Further, the discharge holes 310 on the downstream side are formed so as to be smaller in discharge hole opening diameter than the discharge holes 210 on the upstream side.

As a substantially uniform oil pressure is applied to the plurality of oil supply nozzles provided in the journal bearing 100, a smaller quantity of lubricant oil is supplied from the downstream side oil supply nozzle 31a in which are formed the discharge holes 310 small in opening diameter than from the upstream side nozzle 21a in which are formed the discharge holes 210 large in opening diameter. The guide metal oil supply nozzle 41 is formed in the same shape as the downstream side oil supply nozzle 31a, and the same quantity of lubricant oil is supplied from the two nozzles.

The upstream side oil supply nozzles 21a and 21b, having the same shape, are configured to supply the same quantity of lubricant oil. Also, the downstream side oil supply nozzles 31a and 31b and guide metal oil supply nozzle 41, having the same shape, can supply the same quantity of lubricant oil which is less than the upstream side oil supply nozzle 21a.

Herein, a description will be given of a lubricant oil quantity to be supplied to the upstream side pad 20 or downstream side pad 30 of the journal bearing 100.

A lubricant oil quantity Q to be supplied to one pad configuring the journal bearing 100 is calculated using the equation described below.

$$Q = K * h * L * v$$

Q: Oil supply quantity per pad
h: Oil film thickness at pad entrance
L: Effective length of pad
v: Peripheral speed of rotation of shaft
K: Coefficient That is, an oil quantity Q1 which is the sum of lubricant oil supplied from the upstream side oil supply nozzles 21a and 21b of the upstream side oil supply portion 21 is a quantity equivalent to the oil quantity Q to be supplied to the upstream side pad 20 (an oil quantity supplied to one pad) (Q1=Q).

Further, an oil quantity Q2 supplied to the downstream side pad 30 from the downstream side oil supply nozzles 31a and 31b of the downstream side oil supply portion 31 is a quantity (Q-α) wherein a carry-over oil quantity (α) flowing into the downstream side pad 30 from the upstream side pad 20 is subtracted from the oil quantity Q to be supplied to one pad (Q2=Q-α). Specifically, a configuration is adopted such that by adjusting the size of the opening diameters of the discharge holes 210 and 310 of the oil supply nozzles to make the opening diameter of the discharge holes 310 smaller than that of the discharge holes 210, the lubricant oil supply quantity of the downstream side oil supply portion 31 becomes smaller than that of the upstream side oil supply portion 21 by the carry-over oil quantity.

Next, a description will be given of a bearing loss reduction effect of the journal bearing 100 of Embodiment 1 of the invention by showing a result of a verification experiment conducted by the inventors.

As the journal bearing 100, one with a shaft diameter of 500 mm is used. Further, as a comparison example compared with the journal bearing 100 of Embodiment 1 of the invention, an investigation is carried out on a journal bearing wherein the respective oil quantities supplied from the five oil supply nozzles disposed in the journal bearing 100 are the same.

In the journal bearing 100 of the comparison example, a quantity of lubricant oil equivalent to the oil quantity Q is supplied to each of the upstream side pad 20 and downstream side pad 30, and a quantity Q/2 of lubricant oil is supplied to the guide metal 13 from the guide metal oil supply nozzle 41. The discharge holes of a total of five nozzles are the same in number and diameter. Looking at the journal bearing as a whole, a total supply quantity of lubricant oil in the comparison example is 2.5Q.

As opposed to this, in the journal bearing 100 of Embodiment 1 of the invention, the same quantity of lubricant oil as in the comparison example is supplied to the upstream side pad 20, while an about 35% less lubricant oil (an oil quantity equivalent to Q-α) is supplied to the downstream side pad 30 than to the upstream side pad 20, and a quantity (Q-α)/2 of lubricant oil is supplied to the guide metal 13 from the guide metal oil supply nozzle 41. Specifically, the heretofore described individual supply quantities are realized by adjusting the size of the diameters of the discharge holes formed in the nozzles. Looking at the journal bearing as a whole, the total supply quantity of lubricant oil in Embodiment 1 of the invention can be reduced by about 20% as compared with that in the comparison example. Also, at this time, it is possible to reduce the loss of the journal bearing 100 of Embodiment 1 by about 25% as compared with that of the comparison example.

Also in the investigation experiment, the journal bearing 100 of Embodiment 1 of the invention is such that the quantity of lubricant oil supplied to the downstream side pad 30 is made less than the quantity of lubricant oil supplied to the upstream side pad 20 by an amount equivalent to the carry-over oil, but as a sufficient oil film can be formed between each pad and the rotating shaft 101, the temperature of the oil film never becomes excessively high, and no shaft oscillation or the like occurs, thus enabling a good operating condition to be maintained.

Herein, as heretofore described, the individual oil supply nozzles of the journal bearing 100 are connected to the unshown oil supply equipment via the oil supply pipe portion 50. The oil supply equipment is a piece of equipment for retaining and stirring lubricant oil and circulating the lubricant oil. In the journal bearing 100 which is supplied with as much as hundreds of liters of lubricant oil per minute, a reduction in the supply quantity of lubricant oil is an important condition for downsizing the oil supply equipment. Also, when the oil supply equipment can be downsized, it is also possible, accordingly, to reduce the energy necessary to operate the equipment.

Further, in the journal bearing 100 of Embodiment 1 of the invention, the supply quantity of lubricant oil for the whole of the bearing can be made less than in the comparison example by about 20%. Therefore, the necessary lubricant oil quantity itself can be reduced, and in addition, it is possible to downsize the oil supply equipment necessary for circulation. Furthermore, by adopting the configuration of reducing the lubricant oil quantity supplied to the downstream side pad 30 and thus supplying an oil quantity appropriate for each pad, it is also possible to reduce the bearing loss by about 25%.

Embodiment 2

Figure 4:
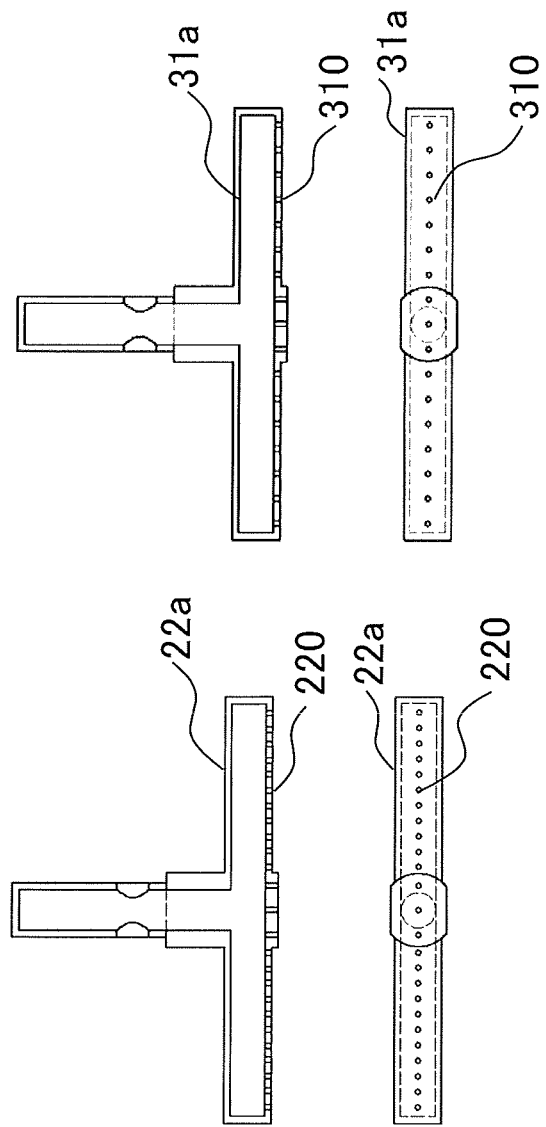
FIG. 4 illustrates sectional views of oil supply nozzles configuring a journal bearing according to Embodiment 2 of the invention and plan views showing discharge holes of the oil supply nozzles.

Hereafter, a description will be given, based on FIG. 4, of a journal bearing 100 of Embodiment 2 of the invention. FIG. 4 illustrates sectional views of an upstream side oil supply nozzle 22a and downstream side oil supply nozzle 31a configuring the journal bearing 100 according to Embodiment 2 of the invention, and plan views showing discharge holes 220 and 310 of the individual nozzles. In FIG. 4, the discharge holes 220 are formed in the upstream side nozzle 22a which supplies lubricant oil to the upstream side pad 20. In the example of FIG. 4, the discharge holes 220 are provided in 25 places of one upstream side oil supply nozzle 22a. As opposed to this, the discharge holes 310 of the same diameter as that of the discharge holes 220 are provided in 17 places of the downstream side oil supply nozzle 31a which are less than in the upstream side oil supply nozzle 22a.

In this way, when the diameter of one discharge hole opened in a nozzle is the same, it is possible to adjust a discharge rate using a method of increasing the number of openings of the upstream side oil supply nozzle 22a, which requires a large oil quantity, and decreasing the number of openings of the downstream side oil supply nozzle 31a, which requires a small oil quantity, in accordance with the supply quantity of lubricant oil.

As shown in Embodiment 2, it goes without saying that in addition to the technique of adjusting the number of discharge holes of the nozzles so as to comply with the discharge rate, it is also possible to combine the technique of adjusting the size of the diameters of the discharge holes which is shown in Embodiment 1.

Embodiment 3

Figure 5:
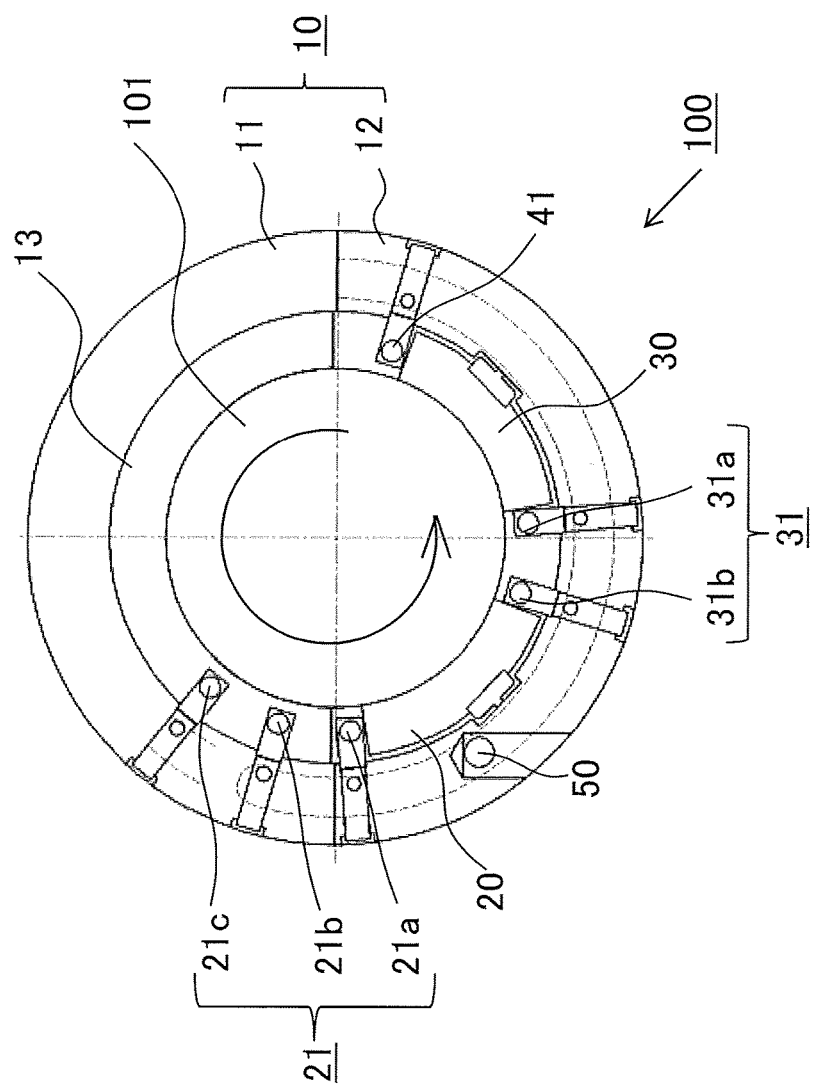
FIG. 5 is a main portion sectional side view perpendicular to the axial direction of a journal bearing according to Embodiment 3 of the invention.

Hereafter, a description will be given, based on FIG. 5, of a journal bearing 100 of Embodiment 3 of the invention. FIG. 5 is a main portion sectional side view perpendicular to the axial direction of the journal bearing 100. In the heretofore described Embodiment 1, it is shown that the upstream side oil supply portion 21 is of a configuration including two nozzles, the upstream side oil supply nozzles 21a and 21b, but in Embodiment 3, it is shown that a configuration is such that another upstream side oil supply nozzle 21c is added. As shown in FIG. 5, a configuration is such that lubricant oil is supplied to the upstream side pad 20 from the three upstream side oil supply nozzles 21a, 21b, and 21c disposed separately from one another, while a configuration is such that oil is supplied to the downstream side pad 30 from the two downstream side oil supply nozzles 31a and 31b disposed separately from one another, and the number of nozzles for the downstream side pad 30 is smaller by one than that for the upstream side pad 20. When the upstream side oil supply nozzles 21a, 21b, and 21c, downstream side oil supply nozzles 31a and 31b, and guide metal oil supply nozzle 41 are made the same in their shape (the number of openings, the diameter of openings), the quantity of oil supplied is large when the number of nozzles which carry out an oil supply to one pad is large, and on the other hand, the quantity of oil supplied is also small when the number of nozzles is small.

In Embodiment 3, three nozzles' worth of oil quantity (Q1) can be supplied from the upstream side oil supply nozzles 21a, 21b, and 21c, and two nozzles' worth of oil quantity (Q2) can be supplied from the downstream side oil supply nozzles 31a and 31b, thus enabling the realization of an oil supply quantity close to that in the investigation experiment shown in the heretofore described Embodiment 1.

Also, in this case, as all the nozzle shapes are the same, the advantageous effect that the kinds of nozzles can be reduced can also be obtained.

In the heretofore described example, the number of nozzles which supply oil to the upstream side pad 20 is set to three, and the number of nozzles which supply oil to the downstream side pad 30 is set to two, but it is also possible to change the number of nozzles to, for example, two nozzles which supply oil to the upstream side pad 20 and one nozzle which supplies oil to the downstream side pad 30. In this case, when no appropriate oil supply quantity can be supplied to each pad simply by adjusting the number of nozzles, it goes without saying that it is possible to optimize a supply oil quantity, for example, by changing a nozzle discharge quantity for each pad, using the technique of adjusting the diameter or number of openings of the discharge holes which is shown in the heretofore described Embodiment 1 or Embodiment 2.

Embodiment 4

Figure 6:
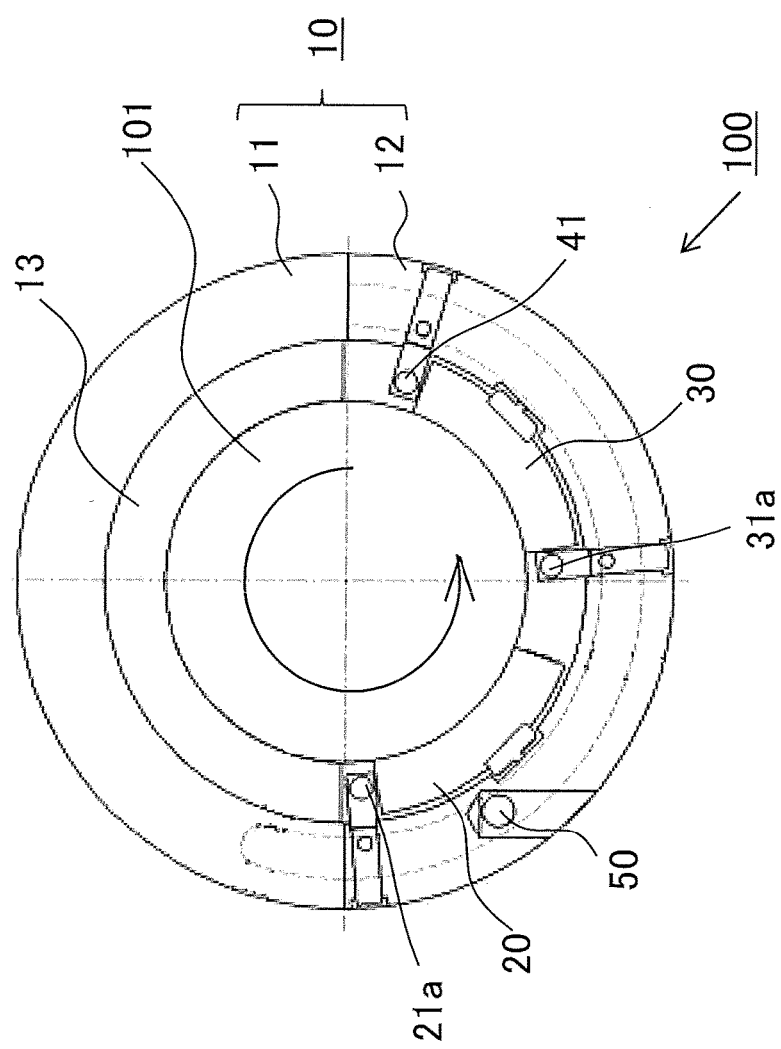
FIG. 6 is a main portion sectional side view perpendicular to the axial direction of a journal bearing according to Embodiment 4 of the invention.

Hereafter, a description will be given, based on FIG. 6, of a journal bearing 100 of Embodiment 4 of the invention. FIG. 6 is a main portion sectional side view perpendicular to the axial direction of the journal bearing 100. In the heretofore described Embodiment 1, an example is shown wherein two nozzles are formed in each of the upstream side oil supply portion 21 and downstream side oil supply portion 31, but in Embodiment 4, an example is shown wherein the upstream side oil supply portion 21 is configured of one upstream side oil supply nozzle 21a, and the downstream side oil supply portion 31 is configured of one downstream side oil supply nozzle 31a.

As heretofore described, the journal bearing 100 of the invention is of a configuration such that when comparing the lubricant oil quantity supplied to the upstream side pad 20 and the lubricant oil quantity supplied to the downstream side pad 30, the quantity supplied to the downstream side pad 30 is less by an amount equivalent to the carry-over oil. Because of this, it is necessary to adjust the oil supply quantity of the upstream side oil supply nozzle 21a and downstream side oil supply nozzle 31a in accordance with the oil quantity supplied to each pad, and specifically, it is possible to realize the necessity by the adjustment of the diameter of openings of each nozzle, which is shown in FIG. 3 of Embodiment 1, or the adjustment of the number of openings of each nozzle, which is shown in FIG. 4 of Embodiment 2, or by an adjustment which is the combination of the two adjustments.

The invention is such that it is possible to freely combine the individual embodiments and appropriately modify or omit any of the individual embodiments within the scope of the invention.

The invention claimed is:

1. A journal bearing comprising:
a carrier ring having an upper half carrier ring and lower half carrier ring disposed on an outer peripheral side of a horizontally installed rotatable shaft;
a first pad disposed on an inner side of the lower half carrier ring and a second pad disposed on a downstream side of the first pad;
a first oil supply portion including at least one first oil supply nozzle which supplies lubricant oil between the rotatable shaft and the first pad and a second oil supply portion including at least one second oil supply nozzle which supplies lubricant oil between the rotatable shaft and the second pad, wherein
a diameter of discharge holes opened in the at least one second oil supply nozzle is smaller than a diameter of discharge holes opened in the at least one first oil supply nozzle so that a supply quantity of lubricant oil supplied from the second oil supply portion is less than a supply quantity of lubricant oil supplied from the first oil supply portion.

2. The journal bearing according to claim 1, wherein the at least one first oil supply nozzle is two first oil supply nozzles that are provided in two mutually separate places, and
the at least one second oil supply nozzle is two second oil supply nozzles that are provided in two mutually separate places.

3. The journal bearing according to claim 1, wherein the at least one first oil supply nozzle is one first oil supply nozzle that is provided in one place, and
the at least one second oil supply nozzle is one second oil supply nozzle that is provided in one place.

4. The journal bearing according to claim 1, wherein the journal bearing is used in a rotatable electric machine.

5. A journal bearing comprising:

a carrier ring having an upper half carrier ring and lower half carrier ring disposed on an outer peripheral side of a horizontally installed rotatable shaft;

a first pad disposed on an inner side of the lower half carrier ring and a second pad disposed on a downstream side of the first pad;

a first oil supply portion including at least one first oil supply nozzle which supplies lubricant oil between the rotatable shaft and the first pad and a second oil supply portion including at least one second oil supply nozzle which supplies lubricant oil between the rotatable shaft and the second pad, wherein a number of discharge holes opened in the at least one second oil supply nozzle is smaller than a number of discharge holes opened in the at least one first oil supply nozzle so that a supply quantity of lubricant oil supplied from the second oil supply portion is less than a supply quantity of lubricant oil supplied from the first oil supply portion.

6. The journal bearing according to claim 5, wherein the at least one first oil supply nozzle is one first oil supply nozzle that is provided in one place, and the at least one second oil supply nozzle is one second oil supply nozzle that is provided in one place.

7. A journal bearing according to claim 5, wherein the at least one first oil supply nozzle is two first oil supply nozzles that are provided in two mutually separate places, and the at least one second oil supply nozzle is two second oil supply nozzles that are provided in two mutually separate places.

8. A journal bearing comprising:

a carrier ring having an upper half carrier ring and lower half carrier ring disposed on an outer peripheral side of a horizontally installed rotatable shaft;

a first pad disposed on an inner side of the lower half carrier ring and a second pad disposed on a downstream side of the first pad;

a first oil supply portion including at least two first oil supply nozzles which supplies lubricant oil between the rotatable shaft and the first pad and a second oil supply portion including at least one second oil supply nozzle which supplies lubricant oil between the rotatable shaft and the second pad, wherein a number of the at least one second oil supply nozzle is smaller than a number of the at least two first oil supply nozzles so that a supply quantity of lubricant oil supplied from the second oil supply portion is less than a supply quantity of lubricant oil supplied from the first oil supply portion.

9. The journal bearing according to claim 8, wherein the at least one first oil supply nozzle is three first oil supply nozzles that are provided in three mutually separate places, and the at least one second oil supply nozzle is two second oil supply nozzles that are provided in two mutually separate places.

* * * * *